Dec. 26, 1922.
J. E. CASTLE.
COLLAPSIBLE RIM.
FILED MAR. 27, 1920.
1,439,943
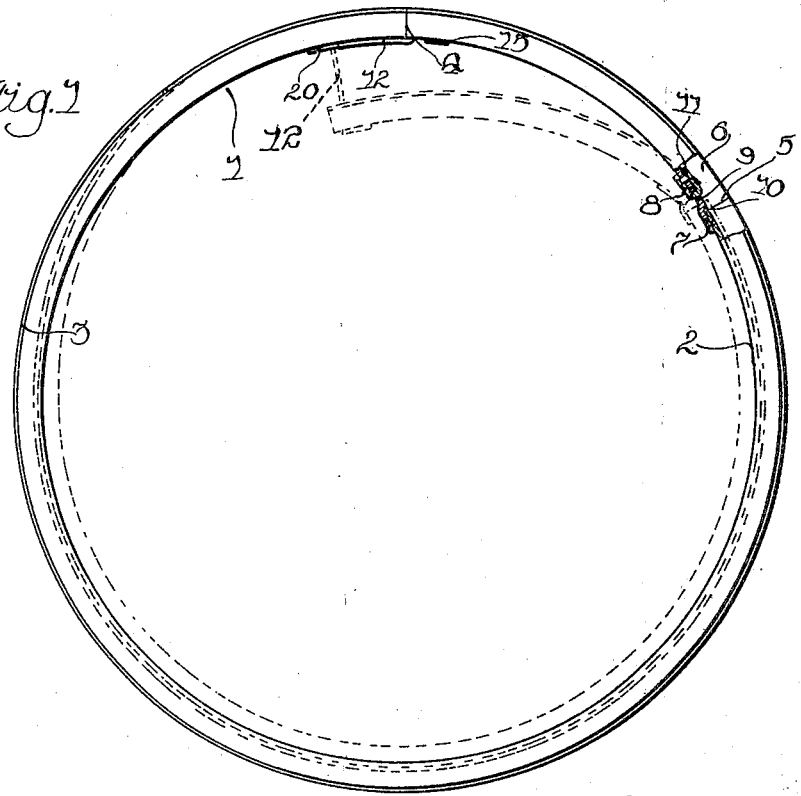
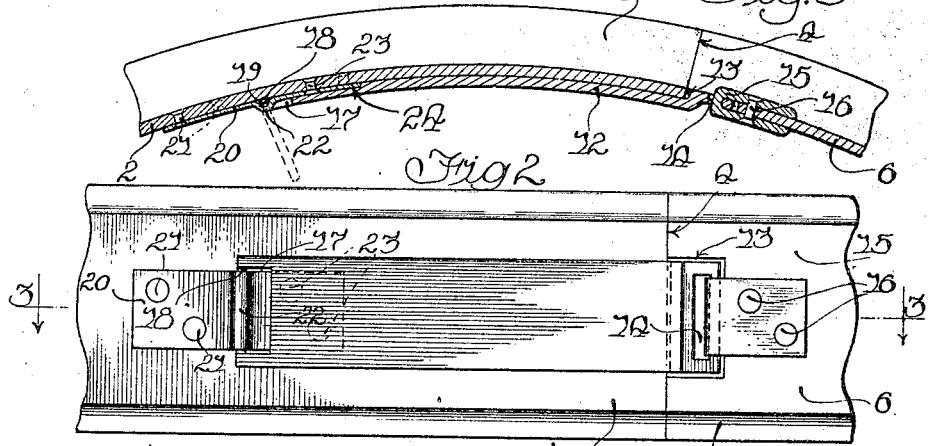
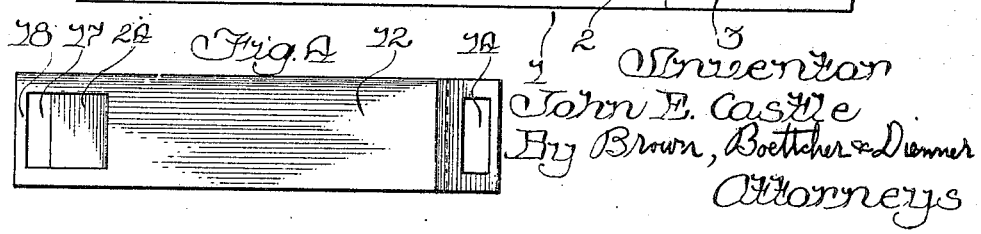
Inventor
John E. Castle
By Brown, Boettcher & Dienner
Attorneys Patented Dec. 26, 1922.

1,439,943

UNITED STATES PATENT OFFICE.

JOHN E. CASTLE, OF RIDGE FARM, ILLINOIS, ASSIGNOR OF ONE-HALF TO JOSEPH C. JONES, OF RIDGE FARM, ILLINOIS.

COLLAPSIBLE RIM.

Application filed March 27, 1920. Serial No. 369,385.

*To all whom it may concern:*

Be it known that I, JOHN E. CASTLE, a citizen of the United States, residing at Ridge Farm, in the county of Vermilion and State of Illinois, have invented a certain new and useful Improvement in Collapsible Rims, of which the following is a full, clear, concise, and exact description, reference being had to the accompanying drawings, forming a part of this specification.

My invention relates to demountable rims and particularly to demountable rims of the type adapted to be collapsed or otherwise contracted within their normal circumference sufficiently to permit insertion into and removal from the tire.

In my co-pending application, Serial No. 361,071, filed February 24, 1920. I have provided a novel, simple, compact and comparatively inexpensive rim construction. In the above application I have also provided for reducing interference between the pivotal or hinge connections associated with such a rim and the wheel or tire.

The primary aim of the present invention, which forms an improvement on the above application, is to still further reduce interference between the pivotal or hinge connections associated with a collapsible rim and the wheel or tire, to still further reduce the expense and simplify the construction of such a rim and to minimize, if not alleviate, any other drawbacks to the employment of such a rim.

In order that those skilled in the art may be fully acquainted with the nature and scope of the invention I shall describe a specific embodiment of the invention in connection with the accompanying drawings which form a part of the present specification.

In the accompanying drawings,

Figure 1 is a side elevational view partly in section, of a rim embodying the features of the present invention;

Figure 2 is a fragmentary inner plan view of the rim showing the connection between the adjacent ends thereof with which this invention is particularly concerned;

Figure 3 is a vertical sectional view taken substantially on the line 3—3 of Figure 2; and Figure 4 is an outer plan view of the connecting link through which the adjacent ends of the rim are connected.

Referring to the drawings, the rim 1 is of the general type disclosed in my co-pending application, Serial No. 361,071, filed February 24, 1920, comprising a base or web portion 2 having a side or marginal flange 3 circumferentially about each edge thereof. These flanges are adapted for co-operation with the base beads of the tire carried by the rim to hold the tire firmly in place. The applicability of the present invention is not limited to any particular type of rim. Therefore, the invention is not concerned with the details of construction of the rim, the particular rim disclosed being simply illustrative, to familiarize those skilled in the art with a particular embodiment of the invention.

The rim 1 is cut or split transversely at the points 4 and 5 providing a gap between the opposite ends of the rim, which gap is normally bridged by a segment 6.

While the second cut 5 is really immaterial in so far as the present invention is concerned, having illustrated such cut I have shown the end of the segment 6 adjacent the same connected with the adjacent end of the rim 1 in substantially the manner disclosed in my hereinbefore referred to co-pending application, i. e., through a relatively thin plate or link 7 and strap 8. One end of the plate or link 7 is riveted or otherwise securely attached to the inner face of the base or web portion 2 of the rim 1. The opposite free end of the link 7 is provided with an oblong aperture or slot 9. The end of the segment 6, adjacent the cut 5, is slotted or recessed as shown at 10. The slotted or apertured end of the link 7 is bent or otherwise shaped so as to normally lie in the recess 10 in substantial alignment with or in the arc of the web portion 2 of the rim occupying substantially the entire recess or slot 10. Thus the continuity of the web 2 is not materially interferred with by the slot or recess 10 when the rim is in its normal or expanded position.

The metallic strap 8 having one end arranged along the inner face of the web portion 2 of the segment 6, extends up through the oblong slot or aperture 9 provided in the free end of the link 7 and back along the outer face of the web portion 2. The opposite ends of the strap 8 are securely atttached to the inner and outer faces respectively of the web portion 2 of the segment 6 by suitable securing means, as for instance, a rivet 11 extending through the web 2 and the opposite ends of the strap 8 and headed over substantially flush with the outer surfaces respectively of the strap.

The opposite end of the segment 6 is connected with the adjacent end of the rim through a link, which link will allow the end of the segment 6 associated therewith to be swung about the hinge or pivotal connection 7—8 into position within the adjacent end of the rim, contracting the normal circumference of the rim to permit of its insertion into and removal from the tire.

This link connection comprises a link 12 normally arranged against the inner periphery of the rim as shown in Figures 1 and 3. The end of the segment 6 adjacent the cut 4 is slotted or recessed as shown at 13. One end of the link 12 is bent or otherwise shaped so as to normally lie in the recess 13 in substantial alignment with or in the arc of the web portion 2, occupying substantially the entire recess. An aperture 14 is provided in this off-set end of the link 12. A metallic strap 15, having one end arranged along the inner face of the web portion 2 of the segment 6 extends up through the aperture 14 provided in the link 12 and back along the outer face of the web 2. The opposite ends of this strap 15 are securely attached to the inner and outer faces respectively of the web 2 by suitable securing means, as for instance, the rivets 16, which extend through the web 2 and the opposite ends of the strap and are headed over substantially flush with the outer surfaces respectively of the strap.

The opposite end of the link 12 is slotted or apertured as shown at 17 providing a pintle 18, through which pintle 18 this end of the link 12 is hingedly or pivotally connected with the web portion 2 of the rim. It will be noted that the hinge or pivotal connection between the link 12 and the web 2 is spaced back from the cut 4. The outer surface of the pintle 18 is substantially flush with the outer surface of the link 12, while the inner surface of the pintle is set back or reduced as shown at 19 so as to lie within the inner surface of the link.

A metallic strap 20 having one end arranged along the inner face of the hub 2 and securely attached thereto as through suitable rivets 21, is provided within its length with a transverse channel or knuckle 22, which transverse knuckle 22 embraces the pintle 18 of the link 12. The opposite end of the metallic strap 20 extends up through the aperture 17 and is securely attached to the inner face of the web portion 2 of the rib through suitable securing means, as for example, the rivets 23.

The outer surface of the link 12 is chamfered or scarfed back from the aperture 17, as shown at 24, to receive the adjacent end of the metallic strap 20. Thus a tenon connection is effected between the strap 20 and the link 12, when the rim is in its normal or expanded position, which tenon connection effectively aligns the link 12 and consequently the adjacent ends of the rim 1 and segment 6 respectively at the cut 4 and maintains the same in proper alignment. The dowel pins and various other aligning means of the prior art are thus avoided.

The rim is collapsed by exerting sufficient pressure within the length of the outer periphery of the segment 6 to spring this segment about its hinge or pivotal connection with the rim through the link 7. The opposite ends of the links 12 will thereupon pivot about the strap 15 and the pintle 18 respectively until the link 12 assumes substantially the position shown in dotted lines in Figure 1. The link 12, with its pivotal or hinge connection with the rim 1 and segment 6, together with the segment and its pivotal or hinge connection with the opposite end of the rim act as a toggle in forcing the rim either to expanded or collapsed position. In the event that the hinge or pivotal connection through the link 7 is omitted, the rim is broken at the cut 4 and one end of the rim is sprung within and past the opposite end of the rim to contract the normal circumference of the rim sufficiently to permit insertion into and removal from the tire.

The link 12 is relatively thin and occupies but a very small radial space so as to not interfere with the proper placement of the rim upon the wheel. The strap 15 is at most no heavier than the link 12, its inner surface being preferably substantially concentric with the inner surface of the link 12. The outer surface of the strap 15 occupies but a very small radial space so as not to interfere with the tire carried by the rim. The pivotal connection between the link 12 and the rim 1 is not accompanied by the usual protruding knuckle. Furthermore this pivotal connection in no way interferes with the continuity of the outer surface of the rim and consequently with the tire carried by the rim. The simplicity of construction is of a high order and the expense incident to the production of a highly effective compact and practical rim is reduced. The one slot provided in the web of the rim is occupied by one end of the link 12 when the rim is in its expanded or normal position and the continuity of such web thereby not interfered with.

The teachings of the present invention may be embodied in the original construction of the rim, or a rim of the ordinary or any preferred type may be converted into a collapsible rim in accordance with the invention in a simple and inexpensive manner.

I do not intend to be limited to the specific disclosure or precise arrangement specified, but aim to cover all modifications and adaptations coming within the scope of my invention as set out in the appended claims.

I claim:

1. In combination, a rim provided with a break therein, a hinge link connecting the ends of the rim at the break, said hinge link having pivotal connection with the rim through a pintle mounted in a strap carried by the rim, said mounting strap being arranged in the arc of the hinge link and confined wholly within the radial dimension thereof when the rim is expanded, the hinge link being scarfed for the reception of the adjacent end of the mounting strap to effect a tenon connection therebetween.

2. In combination, a rim provided with a break therein, a hinge link connecting the ends of the rim at the break, said hinge link having pivotal connection with the rim through a pintle mounted in a strap carried by the rim, the outer surface of the hinge link being scarfed for the reception of the adjacent end of the mounting strap to effect a tenon connection therebetween, the inner surface of said hinge link radially opposite the scarfed portion of the outer surface thereof being substantially continuous.

3. In combination, a rim provided with a break therein, said rim including a web portion, a hinge link connecting the ends of the rim at the break, one end of said link being bent up into an opening in the web portion of the rim to one side of the break and pivotally mounted upon a pintle arranged in said opening and confined within the radial dimension of the web, the opposite end of said link having pivotal connection with the rim to the other side of the break through a pintle mounted in a strap carried by the rim, said mounting strap being arranged in the arc of the hinge link and confined within the radial dimension thereof when the rim is expanded.

4. In combination, a rim provided with a break therein, said rim including a web portion, a hinge link connecting the ends of the rim at the break, one end of said link being bent up into an opening in the web portion of the rim to one side of the break and pivotally mounted upon a pintle arranged in said opening and confined within the radial dimension of the web, the opposite end of said link having pivotal connection with the rim to the other side of the break through a pintle mounted in a strap carried by the rim, said mounting strap being arranged in the arc of the hinge link and confined within the radial dimension thereof when the rim is expanded, the outer surface of the hinge length being scarfed for the reception of the adjacent end of the mounting strap to effect a tenon connection therebetween, the inner surface of said hinge link radially opposite the scarfed portion of the outer surface thereof, being substantially continuous.

In witness whereof I hereunto subscribe my name this 12th day of March, 1920.

JOHN E. CASTLE.